Aug. 1, 1944.   C. S. WALKER ET AL   2,354,721
MEANS FOR EXTRACTING FRUIT JUICE
Filed Aug. 2, 1940   4 Sheets-Sheet 1

INVENTORS
Charles S. Walker
Bronson C. Skinner
James J. Rucker Bristow
BY Watson, Bristol, Johnson & Leavenworth
ATTORNEYS Charles S. Walker
Bronson C. Skinner
James J. Rucker Bristow
INVENTORS

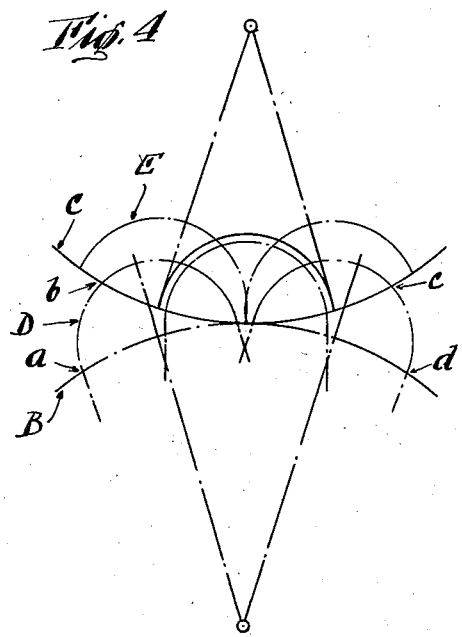
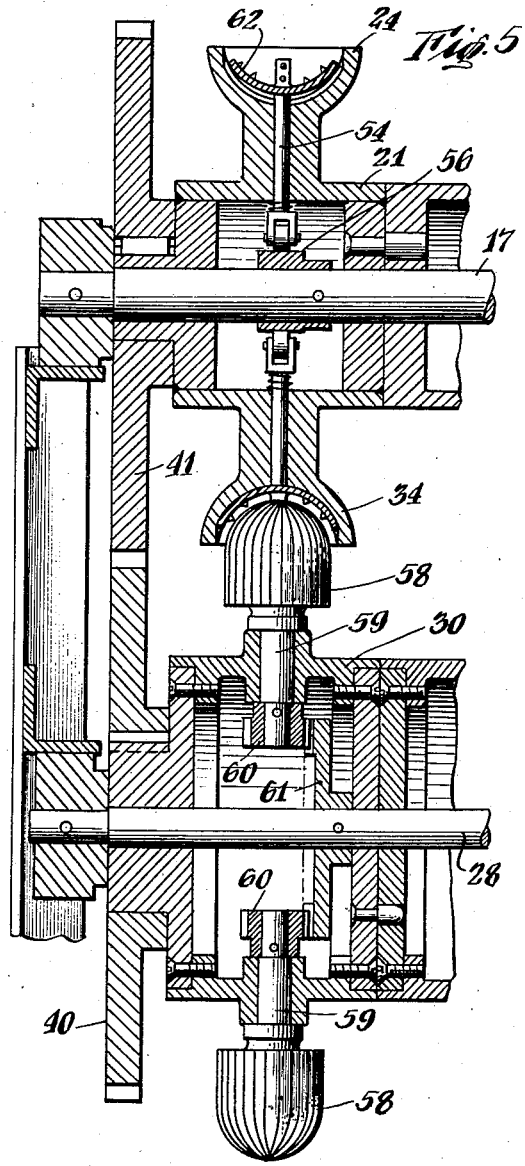
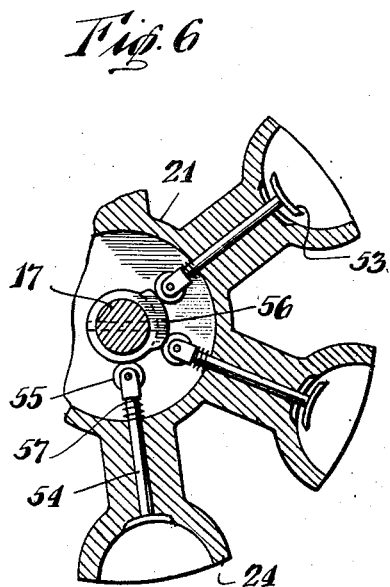

Patented Aug. 1, 1944

2,354,721

UNITED STATES PATENT OFFICE 2,354,721

MEANS FOR EXTRACTING FRUIT JUICE

Charles S. Walker, Clearwater, Bronson C. Skinner, Dunedin, and James J. Rucker Bristow, Safety Harbor, Fla.; said Walker and said Bristow assignors to said Skinner Application August 2, 1940, Serial No. 349,650

13 Claims. (Cl. 100—47)

The present invention relates to apparatus for extracting juice from fruit.

A general object of the invention is the provision of such apparatus which is of practical and rugged construction operable in an efficient automatic manner effectively to handle fruit successively and continuously on a commercial scale for removal of juice therefrom and discharge the latter and the resultant marc separately.

A more specific object of the invention is the provision of such an apparatus which efficiently extracts juice from fruit by means which exerts a gradually increasing pressure on fruit with a wiping action supplemented by additional wiping action as the means are gradually withdrawn from resultant marc.

Another object of the invention is to provide such apparatus which is efficiently capable of extracting juice from fruit kept continuously in motion by moving means cooperating with moving extracting means having their paths of movement so related as to cause the extracting means to apply gradually increasing pressing action to fruit with a wiping action of limited degree for maximum efficiency in juice extraction on a commercial scale which results in the formation of dome-shaped shells of marc out of which the extracting means gradually wipes to assure maximum juice removal.

A still further object of the invention is the provision of such apparatus which is efficiently capable of handling fruit wholly by mechanical means in a manner to slice successive fruits such as citrus fruits into half sections and move the resultant sections through arcuate paths while extracting the juice by wiping substantially conoidal extracting heads into the sections with gradually increasing pressure and then wiping the heads out of resultantly formed dome-shaped shells of marc for maximum efficient removal of juice.

An additional object of the invention is the provision of such apparatus which will accommodate in an efficient and effective manner fruits of varying peel thickness without exerting during extraction of juice excessive pressure upon flesh and peel that may tend to break them up or undue rubbing or reaming action upon the epicarp, with attendant likelihood of inclusion of undesired particles in juice.

Still another object of the invention is the provision of such apparatus characterized by a series of recesses or cups adapted during motion to receive successively from a common source accurately placed fruits avoiding displacement with possible resultant undesired mutilation and consequent contamination of juice which is efficiently and satisfactorily eliminated by certain construction of the receiving means and spacing of the recesses to permit escape of excessively fed or accidentally displaced fruits.

Another object is to provide such apparatus with a large number of fruit receiving recesses or cups so staggered or arranged with respect to each other and to cooperating extracting means as to assure rapid successive extracting operation on fruits one at a time thereby avoiding undue movement or lurching of working parts while eliminating the necessity of excessively heavy structure.

A still further object is the provision of guiding means to assure travel of fruit along a predetermined path so constructed as to permit effective passage therebeyond of extracting means efficiently to extract juice, and which is adapted to permit such operation while the fruit and extracting means are in motion.

Additional objects of the invention are the provisions of kick-out means for efficiently and automatically, during operation of the machine, discharging marc or exhausted peel and flesh from fruit-carrying cups and means for relieving vacuum behind peel in the cups to permit ready removal of exhausted peels.

Other objects of the invention will in part be obvious and will in part appear hereinafter.

The invention accordingly comprises the features of construction, combinations of elements and arrangement of parts which will be exemplified in the construction hereinafter set forth, and the scope of the invention which will be indicated in the claims.

For a fuller understanding of the nature and objects of the invention, reference should be had to the following detailed description taken in connection with the accompanying drawings, in which:

Fig. 4 is a diagrammatic showing of the relationship of the working circles, a fruit receiving or carrying cup and cooperating juice extracting head during juice extracting operation;

Fig. 5 is a sectional elevational view with parts broken away of modified parts of the apparatus of the invention; and Fig. 6 is a broken sectional view of an embodiment of the cup wheel of the apparatus of the invention provided with one form of peel kickout.

The invention and ramifications thereof will be best understood by reference to the drawings in which like numerals refer to like parts throughout.

A supporting frame 10 includes upright standards 11—11 having supporting brackets 12—12 carrying upright rods 13—13. A floating bed frame or deck 14 has vertically apertured bosses 15—15 slidably receiving the rods 13—13 with the lower ends of the bosses serving as stops to limit downward vertical movement thereof. Biasing coil springs 16—16 resist vertical upward movement of the floating bed frame 14.

Figure 2:
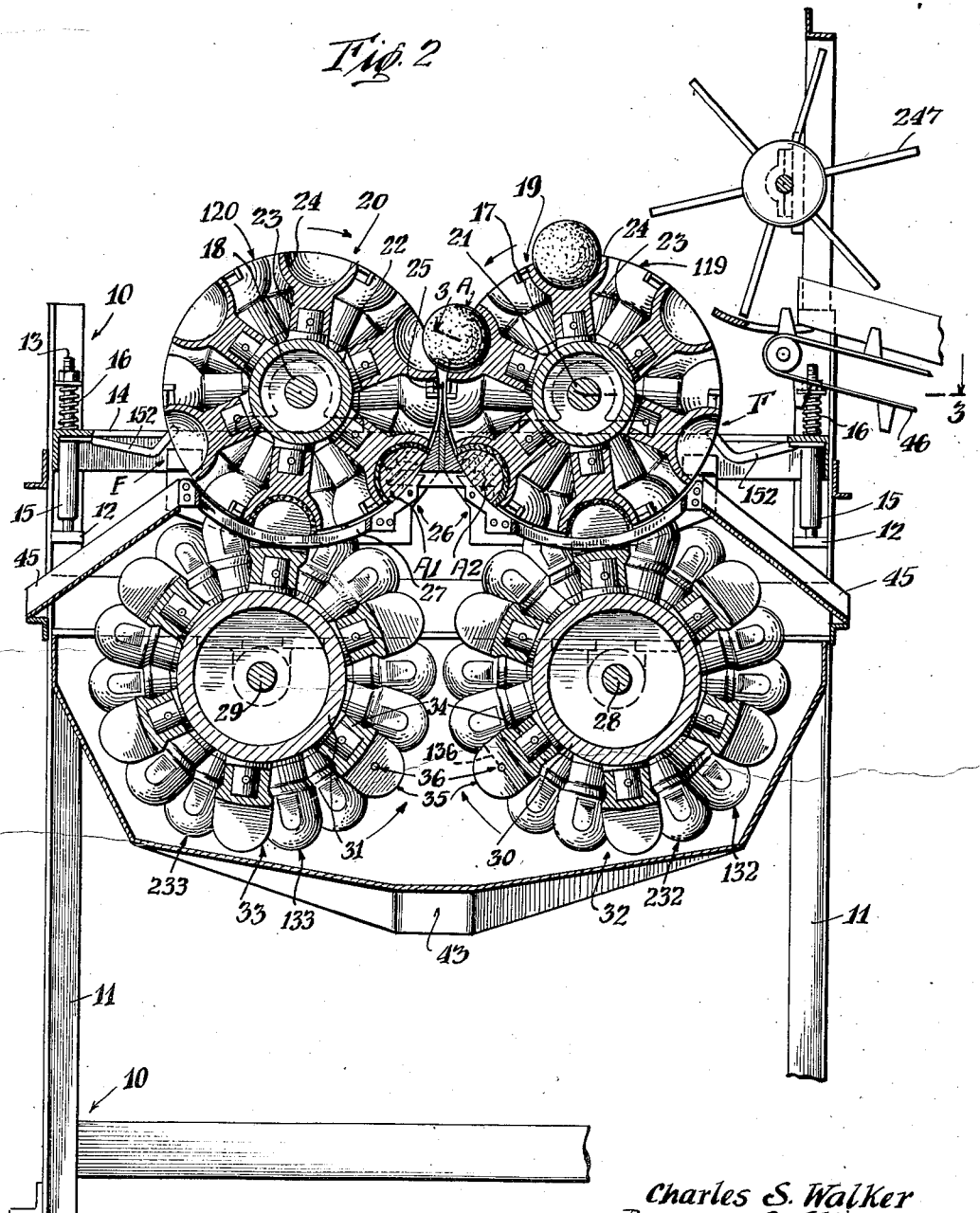
Fig. 2 is a sectional elevational view taken substantially on line 2—2 of Fig. 1.

A pair of horizontally disposed shafts 17 and 18 are mounted substantially at the same height on the floating bed frame 14 with their axes substantially in parallelism as shown. At least one fruit receiving wheel 19 is rotatably mounted on the shaft or axle 17 and another such wheel 20 is rotatably mounted on the shaft or axle 18. These wheels comprise hubs 21 and 22 journaled respectively on the shafts 17 and 18, a plurality of radially extending spokes 23—23 mounted on the hubs and preferably arranged at substantially equal radial angles as shown in Fig. 2, and a plurality of cups 24—24 mounted on the ends of the spokes. The cups preferably are hemispherical in shape to receive and carry globular fruit such as oranges or the like, or sections thereof.

The axes of the wheels 19 and 20 are so spaced that the opposed cups of the two wheels do not contact during rotation of the wheels in opposite directions. A space of minor dimension shown between the wheels 19 and 20 in Fig. 2 accommodates a slicing knife 25 for severing fruit into halves. The cups 24—24 of the two wheels 19 and 20 are arranged substantially in a similar manner so that they will coincide and cooperate to carry between them a fruit "A" past the knife 25 to cut it into two halves, one of which is carried away by a cup 24 of wheel 19 and the other of which is carried away by a cup 24 of wheel 20.

Figure 1:
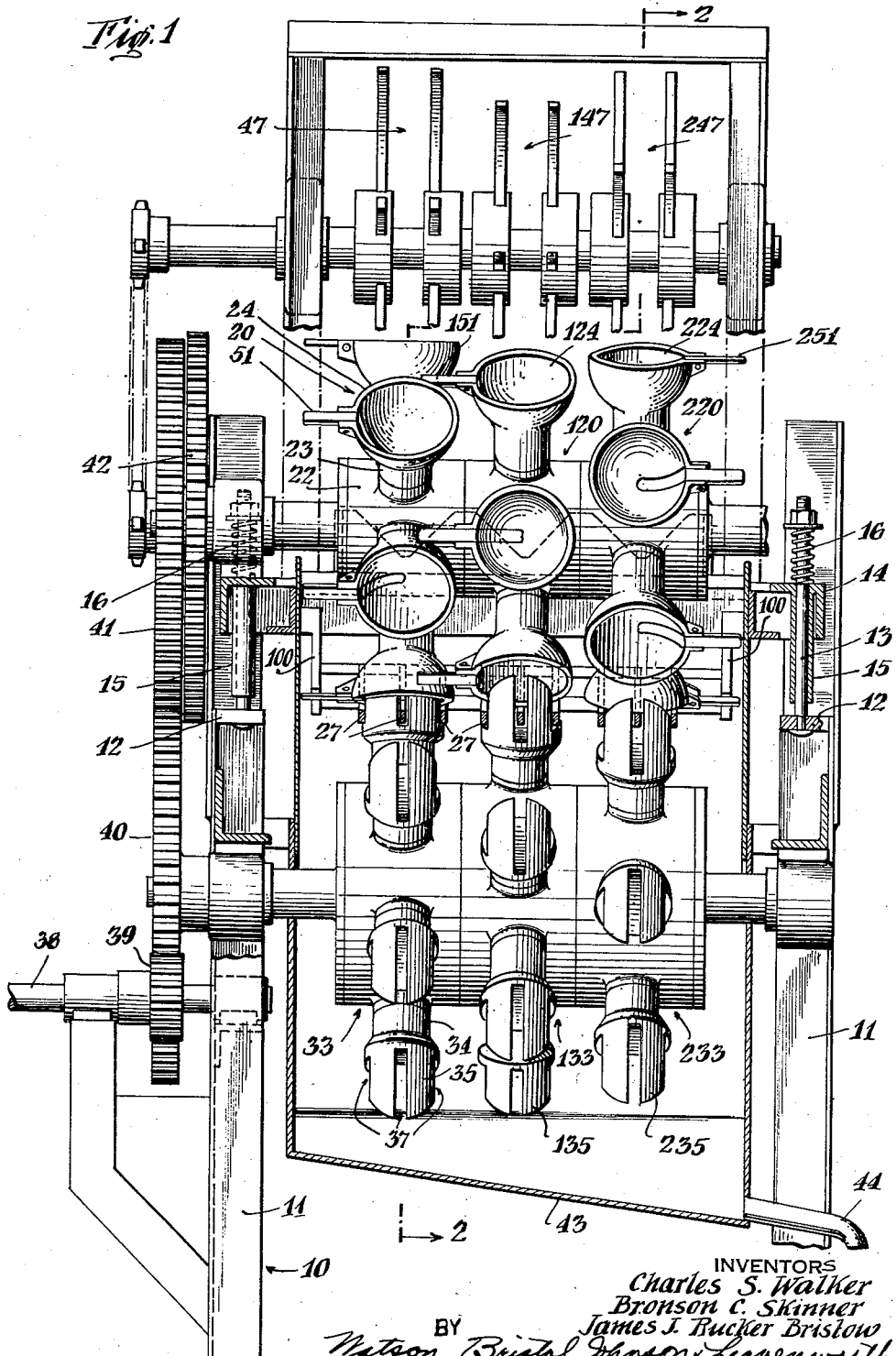
Fig. 1 is a rear elevational view with parts in section and parts broken away of one embodiment of the apparatus of the present invention.

Upon the stationary supporting frame 10 are mounted by suitable brackets 100—100 two arcuate shaped guideways 26, 26 each extending along the path of the periphery of one of said wheels, as shown in Figs. 1 and 2. Each guideway 26 preferably comprises a breast plate having a section at substantially the lowest portion of the path of the cups 24—24 so constructed as to permit passage therebeyond of juice-extracting means. This section may be formed by a plurality of laterally-spaced, longitudinally-extending members such as bars which together with the breast plate form a supporting guide for a fruit section.

The frame 10 also supports a pair of horizontally extending spaced apart shafts or axles 28 and 29 which, though shown fixed to prevent vertical movement thereof, may likewise, or in the alternative, be mounted in a manner to permit limited vertical movement thereof, such as in a manner similar to the mounting of the shafts 17 and 18. Upon the shafts 28 and 29 are respectively rotatably mounted hubs 30 and 31 of juice-extracting wheels 32 and 33 each having a plurality of radially extending spokes 34—34 terminating in juice-extracting heads 35—35. The spokes and heads 34—34 and 35—35 are equal in number and arranged at radial angles similar to those of the spokes and cups 23—23 and 24—24 of the cup-wheels 19 and 20. The axes of the juice-extracting wheels 32 and 33, although located substantially below the axes of the cup wheels 19 and 20 are spaced apart a sufficient distance to permit free rotation of each past the other.

Each juice-extracting head 35—35 is substantially conoidal and preferably is generated on a radius slightly less than the generating radius of the cups 24—24 to permit therebetween sufficient clearance to accommodate peel and flesh of fruit sections. The working bases, approximately indicated at 36—36, of the juice-extracting conoidal heads 35—35 may, if desired, merge with cylindrical portions to form substantially conoidocylindrical members, as shown.

Each juice-extracting head is preferably provided with recesses 37—37 to receive the members or bars 27—27. These recesses, when the bars 27—27 are three in number as shown, may consist of flats on opposite sides of the head and a central slot. The portion of the head between the recesses 37—37 is of sufficient dimension and of such construction as to provide for efficient extraction by pressing and wiping action of a maximum amount of juice from a fruit half.

The four wheels 19, 20, 32 and 33 are preferably driven from a common source of power such as rotating shaft 38 carrying a spur gear 39 in mesh with a gear 40 mounted to rotate the wheel 32. In turn, the gear 40 is meshed with a gear 41 mounted to rotate the wheel 19. Since the wheels 19 and 20 are spaced apart a short distance to accommodate the severing knife 25, it is necessary to provide a gear 42 slightly larger in diameter than the gear 41 to be meshed with a similar gear mounted to rotate the wheel 20. A second gear 40 is mounted to rotate wheel 33 and is meshed with a second gear 41 mounted to rotate with wheel 20. Although the gears 42, 42 are preferably larger in diameter than the gears 40, 40 and 41, 41, when the working circles of the cup wheels and the juice-extracting wheels are substantially equal in diameter, the same speed of rotation of the cup wheels with respect to the juice-extracting wheels is attained by providing the gears 42, 42 with teeth equal in number to the teeth of the gears 41, 41. Further, the gears are provided with elongated teeth to permit relative vertical movement between the cup wheels and juice-extracting wheels.

The working circle of either of the cup wheels 19 and 20 is the circle described by the edges of the cups as they are rotated and the working circle of each of the juice-extracting wheels 32 and 33 is the circle substantially described by the bases of the conoidal juice-extracting heads 35—35 as is substantially indicated at 36—36. The points 36—36 are the points about which the surfaces of the substantially hemispherical heads 35—35, shown by way of example, are generated. The working base of a head 34 is approximately indicated by the dash line 136 in Fig. 2. Preferably, the diameters of these working circles are equal. However, as has been learned by test, they may vary a small amount. The diameters of the working circles of the cup wheels and juice-extracting wheels, if different, however, should not differ more than about ten percent, that is, the diameter of the working circle of the juice-extracting wheel should not be less than nor greater than the diameter of a cup wheel by more than ten percent. Attempts to vary beyond such limits resulted in difficulties. One such attempt was to make the diameter of a circle described through the centers of the cups, substantially equal to the diameter of a circle described through centers of the conoidal juice-extracting heads. Such relationship with wheels having working circles of diameters of about twenty inches such as in the apparatus disclosed herein by way of example, resulted in working circles with the diameter of that of the cup wheel being greater by about twenty percent than the diameter of the working circle of the juice-extracting wheel.

This relationship of the diameters of the working circles is important to efficient operation of the wheels as is diagrammatically indicated in Fig. 4. The working circle B of the juice-extracting wheel is preferably of a radius substantially equal to the radius of the working circle C of the cup wheel. A conoidal juice-extracting head is diagrammatically represented at D and a fruit-carrying cup is diagrammatically represented at E. With the juice-extracting head D and the fruit-carrying cup E rotating in opposite directions toward the right in Fig. 4, it will be seen that the portion $a$—$b$ of the surface of the juice-extracting head will be wiped into and through the cup E and the fruit half therein, and the portion $c$—$d$ of the surface of the juice-extracting head is likewise wiped into, through and out of the cup E and the fruit therein. Accordingly, the linear distance of wiping action is approximately represented by $a$—$b$ plus $c$—$d$. This wiping action, although desirable, must not be so great as to cause destruction of the resulting dome-shaped shell of marc or flesh and peel, some particles of which are highly undesirable in the extracted juice. The limits given above for variations in diameters of working circles are the practical limits for commercial structures where efficient operation is to be consistently attained.

A pan 43 is supported beneath the juice-extracting wheels 32 and 33 to catch the extracted juice as it flows down over the wheels and is so shaped as to collect the juice and deliver it through a spout 44 extending from one side of the machine.

The breast plates or guides 26—26 extend well beyond the juice-extracting localities, as is indicated in Fig. 2, to a marc-discharging locality indicated at F where suitable means are provided for removing or kicking out the marc from the successive cups into ways 45, 45 to be discharged by gravity from the ends of the machine.

A continuous conveyor belt 46 carries fruit toward the fruit-receiving wheel 19 and blade wheel 47, or any other suitable feeding device, synchronized with the cup-wheel 19 accurately places the fruit successively in the cups 24—24.

It is desired to avoid the use of excessively heavy floating bed frame structure 14 and biasing springs 16 to prevent undue mashing and breaking of marc and to prevent undue lurching of the floating structure due to variations in thickness of epicarp. Accordingly, while it is desirable to operate on a large number of fruits in a single machine, the extraction is preferably performed on only a few fruit sections at a time. This is attained by mounting coaxially with the wheels 19, 20, 32 and 33, additional wheels 119, 120, 132 and 133 and 219, 220, 232 and 233, with the cups of the wheels on any one axis and the juice-extracting heads of the wheels on any one axis staggered as shown. Accordingly, only one fruit or two halves thereof are operated on by the juice-extracting means at a time so that full biasing action of the spring and effective weight of the floating bed frame can be utilized for a single fruit during the extraction of juice.

The diameter of the cup-wheel receiving the fruits from the feeding means is preferably so related to the number of cups arranged around the periphery thereof and the dimensions of the latter as to provide sufficient space between the cups to permit unrestricted passage of dislocated or excessively fed fruit therebetween and out of the machine. This avoids any possibility of mashing or mutilating fruits not properly located in cups which might readily result in inclusion in the extracted juice of undesirable particles or essential oil from the cells of the exocarp.

Figure 3:
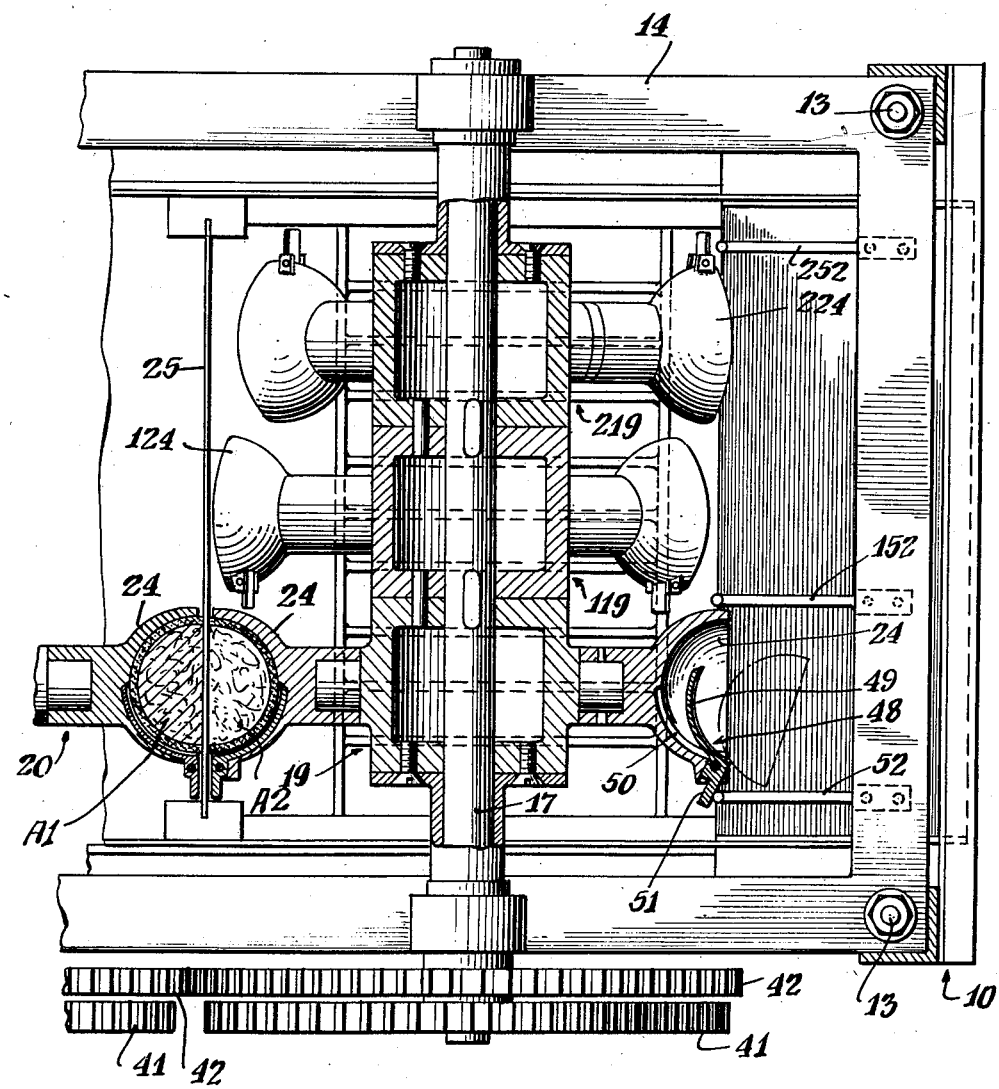
Fig. 3 is a sectional view substantially taken on line 3—3 of Fig. 2, but with the cup loaded with a whole fruit moved forward to the fruit severing or sectioning position.

A suitable kick-out device for the marc in a cup may comprise a pivoted member 48 having a portion 49 shaped similarly to the curvature of the inner wall of the cup and seated wholly within a groove 50 in the cup wall extending from the edge of the cup toward the center thereof as shown in Fig. 3. The member 48 is preferably pivoted to the edge of the cup and provided with an extending arm 51 adapted to be engaged by a member 52 mounted upon the frame at a discharge locality. The portion 49 of the member 48 is preferably of a thickness less than the depth of the groove 50 so as to provide an air passage between the cup wall and the fruit for relieving any vacuum that might be created and that might tend to hold the marc so securely in the cup as to prevent ready removal thereof.

As an alternative, kick-out devices may be provided in the cups by seating in a recess in the bottom of each cup a head 53 mounted upon a plunger 54 carrying on the other end thereof a cam follower 55 adapted to be held against the face of a cam 56 fixed upon the shaft 17 or 18 within the rotating hub 21 or 22, as shown in Fig. 6. The kick-out head 53 is normally biased to seating position by a spring 57.

It is to be understood that the invention is not limited to fixed substantially conoidal juice-extracting heads. Such extracting heads may comprise reamers 58—58 of well-known type as shown in Fig. 5. These reamers may be rotated by their mounting shafts 59—59 carrying spur gears 60—60 meshing with a crown wheel or gear 61 fixedly mounted on the fixed shaft 28 within the hollow hub 30. With such structure, of course, guideways comprising laterally spaced members or bars such as 27—27 cannot be used to hold the fruit halves in the cups 24—24. However, there are a variety of suitable means which may be utilized for this purpose such as means to apply suction to the fruit halves in the cups or suitable kick-out members may be provided with seating heads 62—62 having suitable spurs or projections to pierce and anchor into the peel. The exhausted peel or marc may be readily removed from a cup by pushing it out beyond the edge of the cup by the head 62, so that it can be disengaged by a fixed finger, or the like.

In operation of the embodiment of the device shown in Figs. 1, 2 and 3, fruits such as oranges are delivered by the belt elevator 46 to the blade wheels 47, 147, 247 and successively and accurately placed in cups 24, 124, 224 of one set of cup wheels as they are rotated past the receiving point. The fruits are then carried onward toward the opposed cooperating cup-wheels and finally confined in pockets formed by peripherally coinciding or registering cups of opposed cup-wheels and thereafter carried downwardly past the severing knife 25 to section them into halves such as those indicated at A1 and A2. Thereafter, one half of each fruit is carried above each guideway or breast plate 26 toward the juice-extracting locality of the cup wheel. Simultaneously, the juice-extracting wheel which cooperates with a particular cup-wheel rotates in a direction opposite to the latter so that a juice-extracting head 35 approaches the cup carrying a fruit half in timed relation and enters the same to extract the juice by pressing and wiping action. The extracted juice flows down over the juice-extracting wheel into the collecting pan 43 and out through the delivery spout 44. During continued rotation of the cup wheel and cooperating juice-extracting wheel, the juice-extracting head is wiped out of the cup and the exhausted marc is carried onward to a discharge locality where it is discharged from the cup by a kick-out and passed by gravity down the discharge chute 45. Such operation permits efficient extraction of a maximum amount of juice during continuous operation of the machine, avoids difficulties which might otherwise be encountered due to misplaced and undesired mutilation of fruit and rapidly and effectively extracts juice from a large number of fruits continuously by automatic operation of the apparatus. It will thus be seen that the objects set forth above are effectively obtained.

Since certain changes may be made in the above construction and different embodiments of the invention may be made without departing from its scope, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent, is:

1. Fruit juice extracting apparatus comprising, in combination, a cup-wheel structure rotatably mounted on an axis and having a plurality of rows of fruit receiving cups arranged about its periphery with the cups in each row being adapted successively to carry fruit to a juice extracting locality, the cups of any one row being staggered with respect to those of any other of said rows, a juice extracting wheel structure rotatably mounted on an axis substantially parallel to the axis of said cup-wheel structure, said juice extracting wheel structure having a plurality of rows of substantially conoidal extracting heads arranged about its periphery with the extracting heads of any one row being staggered with respect to those of any other row similar to the staggering of the cups with each extracting head being adapted to enter one of the cups at the juice extracting locality to extract juice from fruit carried therein, resilient means supporting at least one of said wheel structures to permit variation of the distance between the axes of the two wheel structures to accommodate variations in thickness of marc in the cups, and means to rotate said wheel structures in timed relation so that the extracting heads will accurately enter and leave the cups.

2. Fruit juice extracting apparatus comprising, in combination, a cup-wheel structure having a plurality of rows of fruit receiving cups arranged about its periphery with the cups in each row adapted successively to carry fruit to a juice extracting locality, a substantially horizontal axle upon which said wheel structure is mounted with the cups of any one row being staggered with respect to those of any other of said rows, spring means supporting said axle to permit automatic variation of the elevation thereof, a juice extracting wheel structure having a plurality of substantially conoidal extracting heads arranged about its periphery in a plurality of rows, a substantially horizontal axle mounted below said first-mentioned axle and upon which said juice extracting wheel structure is mounted with the extracting heads of any one row being staggered with respect to those of any other row similar to the staggering of the cups whereby each extracting head is adapted to enter one of the cups as it travels along substantially the lowest portion of its path and extract juice from fruit carried therein, the diameter of the working circle of said cup-wheel structure on which the outer edges of the cups approximately lie and that of the working circle of the cooperating extracting wheel structure described approximately through the working bases of the extracting heads being within about ten percent of each other, and means to rotate said wheel structures in timed relation so that the extracting heads will accurately enter and leave the cups.

3. Fruit juice extracting apparatus comprising, in combination, a pair of cup-wheel structures, two substantially horizontal axles mounted substantially in parallelism at approximately the same height with one of said wheel structures mounted on one of said axles and the other of said wheel structures mounted on the other of said axles, each of said wheel structures having a plurality of rows of fruit receiving cups arranged about its periphery with the cups of one wheel structure registering with those of the other wheel structure during rotary movement of said wheel structures in opposite directions and with the cups of any one row on either of the two wheel structures being staggered with respect to those of any other row on the same wheel structure, means for successively delivering fruit to the cups, means for cutting fruits into halves as they are carried by said wheel structures, a spring supported frame on which said axles are mounted to permit automatic variation of the elevation thereof, a pair of juice extracting wheel structures, two more substantially horizontal axles mounted substantially in parallelism at approximately the same height substantially below the two first-mentioned axles, one of said juice extracting wheel structures being mounted on one of said second-mentioned axles and the other wheel structure of said pair of juice extracting wheel structures being mounted on the other of said second-mentioned axles, each of said juice extracting wheel structures having a plurality of rows of substantially conoidal extracting heads arranged about its periphery with the extracting heads of any one row of either of the two of said juice extracting wheel structures being staggered with respect to those of any row on the same wheel structure similar to the staggering of the cups of the cup wheel structures immediately thereabove whereby each extracting head is adapted to enter one of the cups as it travels along substantially the lowest portion of its path and extract juice from a fruit carried therein when the extracting wheels are rotated in directions opposite to those of rotation of the cup wheel structures immediately thereabove, the diameters of the working circles of said cup wheel structures on which the outer edges of the cups approximately lie and those of the working circles of cooperating extracting wheel structures described approximately through the working bases of the extracting heads being within about ten percent of each other, and means to rotate said wheel structures in timed relation so that the extracting heads will accurately enter and leave the cups.

4. In a fruit juice extracting apparatus, the combination comprising rotatably mounted means for moving a fruit half with the cut face thereof presented outwardly approximately describing a circular arc, guiding means for assuring movement of the cut face through the aforementioned arc comprising laterally spaced apart elongated arcuate shaped members extending along the path to be described by the fruit half through a juice extracting locality, and a rotatably mounted conoidal extracting head fixed relative to its axis of generation and recessed to pass said members when rotated through the juice extracting locality into and out of pressing engagement with a fruit half.

5. In a fruit juice extracting apparatus, the combination comprising rotatably mounted means for moving a fruit half with the cut face thereof presented outwardly approximately describing a circular arc, guiding means for assuring movement of the cut face through the aforementioned arc comprising laterally spaced apart elongated arcuate shaped bars extending along the path to be described by the fruit half through a juice extracting locality, and a rotatably mounted conoidal extracting head fixed relative to its axis of generation and transversely recessed to pass said bars when rotated through the juice extracting locality into and out of pressing engagement with a fruit half.

6. In a fruit juice extracting apparatus, the combination comprising rotatably mounted means for moving a fruit half with the cut face thereof presented outwardly approximately describing a circular arc, guiding means for assuring movement of the cut face through the aforementioned arc comprising spaced apart arcuate shaped members, and a rotatably mounted conoidal extracting head fixed relative to its axis of generation and shaped to permit passage thereof beyond said guiding means when rotated into pressing engagement with a fruit half to extract the juice.

7. In a fruit juice extracting apparatus, the combination comprising rotatably mounted means for moving a fruit half with the cut face thereof presented outwardly approximately describing a circular arc, an arcuate shaped breast plate positioned along the path of the fruit half to assure movement of the cut face through the aforementioned arc, said breast plate including a section at a juice extracting locality consisting of a plurality of laterally spaced apart longitudinally extending arcuate shaped members, and a rotatably mounted conoidal extracting head fixed relative to its axis of generation and recessed to receive said members when rotated through the juice extracting locality into and out of pressing engagement with a fruit half.

8. In a fruit juice extracting apparatus, the combination comprising a movable fruit receiving substantially hemispherical cup adapted to carry fruit past a juice extracting locality and having a lip, said cup having a recess in the inner wall thereof extending down into the cup from the lips thereof, and a kick-out member pivoted to said cup having a portion adapted to be seated within the recess behind fruit and means to cause the portion within the cup after the latter has passed the juice extracting locality to be pivoted outwardly to kick out the marc, the recess and the portion of said kick-out member seated therein providing behind fruit seated in the cup an air passage extending into the cup from the lip thereof.

9. In a fruit juice extracting apparatus, the combination comprising a movable fruit receiving substantially hemispherical cup adapted to carry fruit past a juice extracting locality and having a lip, said cup having a groove in the inner wall thereof extending down into the cup from the lip thereof, a kick-out member pivoted on said cup having a shaped portion adapted to be seated wholly within the groove behind fruit and an arm extending substantially laterally of the cup away therefrom, said kick-out member seating within the groove behind fruit in a manner to form an air passage extending into said cup from the lip thereof, and means along the path of said cup beyond the juice extracting locality to engage said arm to cause it to pivot the shaped portion outwardly to kick out the marc.

10. In a fruit juice extracting apparatus, the combination comprising a movable fruit receiving substantially hemispherical cup adapted to carry fruit past a juice-extracting locality, said cup having a recess in the inner wall thereof extending from the edge inwardly down into the cup, a kick-out member pivoted to the edge of said cup having a shaped portion adapted to be seated wholly within the recess behind fruit with the leading face thereof located below the inside cup surface to form an air passage extending into said cup from the edge thereof, and an arm associated with said kick-out member extending beyond the edge of said cup to be engaged by means along the path of said cup after it has passed the juice extracting locality to cause the portion within the cup to be pivoted outwardly to kick out the marc.

11. In a fruit juice extracting apparatus, the combination comprising a movable fruit receiving substantially hemispherical cup adapted to carry a fruit half with the cut face presented outwardly past a juice extracting locality, said cup having a groove in the inner wall thereof extending from the edge down into the cup substantially to the center thereof, a kick-out member pivoted to the edge of said cup having a shaped portion adapted to be seated wholly within the groove behind a fruit half with the leading face thereof recessed below the inside cup surface to form an air passage extending into said cup from the edge thereof, said kick-out member having an arm extending substantially laterally of the cup, and means along the path of said cup beyond the juice extracting locality to engage said arm to cause it to pivot the shaped portion outwardly to kick out the marc.

12. Fruit juice extracting apparatus comprising, in combination, a plurality of rows of circumpositioned fruit receiving cups mounted for rotation about a common axis with each adapted successively to carry fruit to a juice extracting locality, the cups of one row being staggered with respect to those of another row, a plurality of rows of circumpositioned conoidal extracting heads mounted for rotation about a common axis substantially parallel to the first-mentioned axis, the extracting heads of one row being staggered with respect to those of another row similar to the staggering of the cups with each extracting head being adapted to enter one of the cups at the juice extracting locality to extract juice from fruit carried therein, means permitting variation of the distance between the two axes to accommodate variations in thickness of marc in the cups with the cups and extracting heads resiliently biased toward each other for minimization of the distance between the two axes, and means to rotate said cups and extracting heads about their respective common axes in timed relation so that the extracting heads will accurately enter and leave the cups.

13. Fruit juice extracting apparatus comprising, in combination, a plurality of rows of circumpositioned fruit receiving cups mounted for rotation about a common axis with each adapted successively to carry fruit to a juice extracting locality, the cups of one row being staggered with respect to those of another row, a plurality of rows of circumpositioned conoidal pressing heads mounted for rotation about a common axis substantially parallel to the first-mentioned axis with each fixed relative to its axis of generation, the pressing heads of one row being staggered with respect to those of another row similar to the staggering of the cups with each pressing head being adapted to enter one of the cups at the juice extracting locality to press juice from fruit carried therein, means permitting variation of the distance between the two axes to accommodate variations in thickness of marc in the cups with the cups and pressing heads resiliently biased toward each other for minimization of the distance between the two axes, and means to rotate said cups and pressing heads about their respective common axes in timed relation so that the pressing heads will accurately enter and leave the cups.

CHAS. S. WALKER.
BRONSON C. SKINNER.
JAMES J. RUCKER BRISTOW.